US007076214B2

(12) United States Patent
Jabbary

(10) Patent No.: US 7,076,214 B2
(45) **Date of Patent: *Jul. 11, 2006**

(54) EMPLOYING DIFFERENT SIGNAL THRESHOLDS BASED ON TYPE OF INFORMATION TRANSMITTED

(75) Inventor: Mohammad Ali Jabbary, Roswell, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/412,455

(22) Filed: Apr. 11, 2003

(65) Prior Publication Data

US 2003/0190894 A1 Oct. 9, 2003

Related U.S. Application Data

(63) Continuation of application No. 09/563,872, filed on May 3, 2000, now Pat. No. 6,571,084.

(51) Int. Cl.
*H04B 1/00* (2006.01)

(52) U.S. Cl. ......................... 455/69; 455/522; 370/318

(58) Field of Classification Search ................ 455/522, 455/69, 442, 347; 370/318, 332, 331, 465
See application file for complete search history.

(56) References Cited

U.S. PATENT DOCUMENTS

| | | | | |
|---|---|---|---|---|
| 5,884,187 | A | 3/1999 | Ziv et al. | 455/522 |
| 6,216,004 | B1 | 4/2001 | Tiedemann, Jr. et al. | 455/442 |
| 6,385,437 | B1 * | 5/2002 | Park et al. | 455/69 |
| 6,400,929 | B1 | 6/2002 | Ue et al. | 455/69 |
| 6,418,137 | B1 | 7/2002 | Bontu et al. | 370/347 |
| 6,571,084 | B1 * | 5/2003 | Jabbary | 455/69 |

* cited by examiner

*Primary Examiner*—Doris H. To
*Assistant Examiner*—Tan Trinh
(74) *Attorney, Agent, or Firm*—Potomac Patent Group PLLC

(57) ABSTRACT

A method is disclosed for determining whether to transmit from a first unit to a second unit, where the transmission is one of a first type and a second type. In the method, a signal from the second unit is received at the first unit, and the strength of the signal as received at the first unit is measured. A determination is made of whether the transmission is of the first type or the second type, and a first threshold is selected if the transmission is of the first type, or else a second threshold is selected if the transmission is of the second type. The measured signal strength is then compared to the selected threshold, and the transmission proceeds only if the measured signal strength exceeds the selected threshold.

7 Claims, 2 Drawing Sheets

POWER ON PHONE 16 - 201
SCAN FOR ACCEPTABLE CONTROL CHANNELS 18 - 203
SELECT CONTROL CHANNEL 18 - 205
READ CONTROL INFO. FROM SEL. CONTROL CHANNEL 18 - 207
EMPLOY CONTROL INFO. TO REGISTER - 209
SEND PAGE TO PHONE 16 - 211
RECEIVE PAGE - 213
XMIT PAGE ACK. - 215
RECEIVE ACK. - 217
MEAS. ACK. SIG. STRENGTH AS RECV'D AT TOWER 14 - 219
VOICE COM. OR MESS. DATA? - 221
Voice
Data
SEL. VOICE THRESH. - 223a
SEL. DATA THRESH. - 223b
COMPARE MEAS. SIG. STRENGTH TO SEL. THRESH. - 225
VOICE COM. / DATA XMIT ONLY IF MEAS. SIG. STRENGTH EXCEEDS SEL. THRESH. - 227

EMPLOYING DIFFERENT SIGNAL THRESHOLDS BASED ON TYPE OF INFORMATION TRANSMITTED

CROSS-REFERENCE TO RELATED APPLICATION

The present application is a continuation of U.S. patent application Ser. No. 09/563,872, file May 3, 2000 now U.S. Pat. No. 6,571,084, entitled "Employing Different Signal Thresholds Based On Type of Information Transmitted", and issued as U.S. Pat. No. 6,571,084 on May 27, 2003, hereby incorporated by reference in its entirety.

FIELD OF THE INVENTION

The present invention relates to a method for transmitting information from a transmission site to a receiving unit. More particularly, the present invention relates to such a method for deciding whether to transmit the information, wherein the receiving unit is a two-way unit that sends a signal to the site, and wherein the decision to transmit is based on a comparison of the strength of the signal as received at the site against a signal threshold that differs based on the type of information that is to be transmitted.

BACKGROUND OF THE INVENTION

In many transmission systems, a decision on whether to transmit information from a transmission site to a receiving unit is made based on whether the receiving unit will likely actually receive the information to be transmitted. In at least some of such transmission systems, the receiving unit is a two-way unit that can receive the sent transmission from the transmission site and that can also send signals back to the transmission site.

In such transmission systems, one way of deciding whether to transmit the information is to have the receiving unit send a signal to the transmission site, to then examine the strength of such sent signal as received at the transmission site, and to then make a judgment of the ability of the receiving unit to receive the transmitted information based on such signal strength. That is, the ability of the receiving unit to receive the transmitted information from the transmission site may be related, at least roughly, to the strength of a sent signal as received from such receiving unit at such transmission site. More particularly, if the signal strength is relatively strong, it is very likely that the receiving unit can receive the transmitted information. Correspondingly, if the signal strength is relatively weak, it is very likely that the receiving unit cannot receive the transmitted information.

One transmission system where such a decision is made is a cellular telephone system. In such a cellular telephone system, a mobile/cellular phone is a radio transceiver that is coupled to a cellular switch by way of a particular cellular tower that is also a radio transceiver, and the phone and the tower transmit to and receive from each other over pre-defined radio frequencies.

In such cellular telephone system, for example, a decision is made whether voice communications can commence between the tower and the phone based on the strength of a signal sent from the phone and received at the tower. Such signal strength as received at the tower, typically expressed in terms of decibels, is compared to a pre-defined signal strength threshold, also typically expressed in decibels, to determine whether the aforementioned voice communications can commence. More particularly, if the signal strength is stronger than the threshold, it is very likely that the phone can receive the voice communications from the tower, and communications may commence. Correspondingly, if the signal strength is weaker than the threshold, it is very likely that the phone cannot receive the voice communications from the tower, and communications may not commence.

As may be appreciated, the aforementioned cellular telephone system is expanding to include many additional services over and above mere voice communications. In particular, one additional service is data communications, wherein textual/ASCII messages are delivered to a particular cellular telephone for display on a display associated with such cellular phone. The display may be any appropriate display, but is typically a pixelated display such as an LCD screen on the surface of the cellular phone. Thus, a message is composed and sent from an appropriate source, is transmitted to the cellular phone by way of the cellular telephone system, and is then displayed by the cellular phone on the display associated therewith.

As with the decision on whether voice communications can commence, the decision on whether to transmit the message data from the tower to the phone is made based on the strength of a signal sent from the phone and received at the tower. More particularly, if the signal strength is above a pre-defined threshold, it is very likely that the phone can receive the message data from the tower, and transmission thereof may commence. Correspondingly, if the signal strength is below the pre-defined threshold, it is very likely that the phone cannot receive the message data from the tower, and transmission thereof may not commence.

An issue arises in that a typical cellular phone can reliably receive message data even under conditions where voice communications are inadvisable. That is, conditions may exist (1) where both voice communications and message data reception are advisable, (2) where only message data reception is advisable, or (3) where neither voice communications nor message data reception is advisable. Nevertheless, when determining whether voice communications can commence and also when determining whether message data transmission can commence, the aforementioned cellular system compares signal strength to only a single pre-defined threshold, where such threshold is calibrated for voice communications. As a result, message data transmission does not occur under condition (2), above, even though such message data transmission is in fact advisable.

Accordingly, a need exists for a method for deciding whether to transmit message data and for deciding whether voice communications can commence, wherein such decision is based at least in part on one threshold for message data transmission and another threshold for voice communications.

SUMMARY OF THE INVENTION

The present invention satisfies the aforementioned need by providing a method for determining whether to transmit from a first unit to a second unit, where the transmission is one of a first type and a second type. In the method, a signal from the second unit is received at the first unit, and the strength of the signal as received at the first unit is measured. A determination is made of whether the transmission is of the first type or the second type, and a first threshold is selected if the transmission is of the first type, or else a second threshold is selected if the transmission is of the second type. The measured signal strength is then compared to the selected threshold, and the transmission proceeds only if the measured signal strength exceeds the selected threshold.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
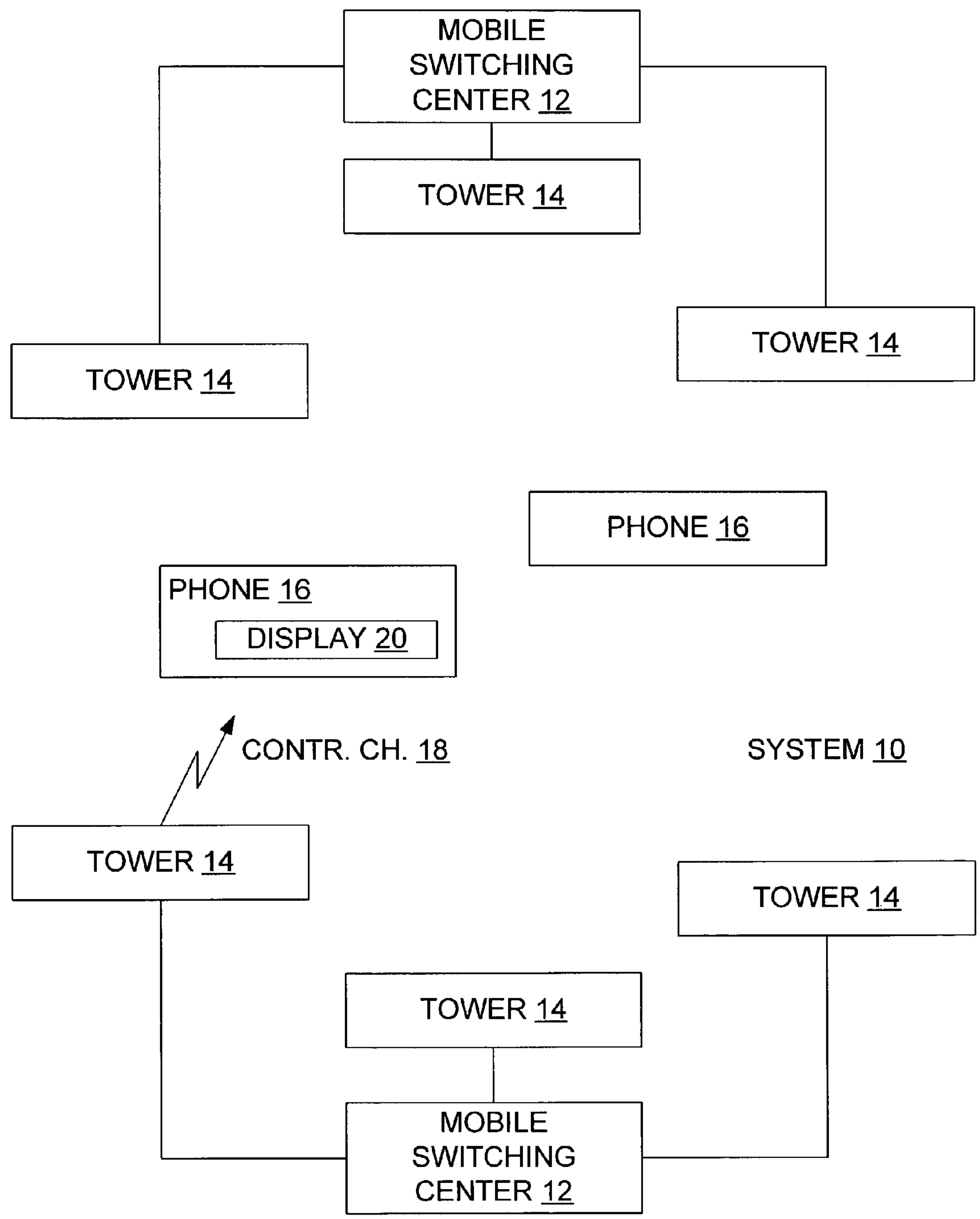
FIG. 1 is a diagrammatic view and shows a typical cellular telephone system such as that which would employ the method of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Referring to the drawings in detail, wherein like numerals are used to indicate like elements throughout, there is shown in FIG. 1 a typical cellular telephone system 10 in accordance with one embodiment of the present invention. As seen, the system 10 includes one or more mobile switching centers 12, one or more radio transceiver cellular towers 14, and one or more cellular telephones 16. As is known, each tower 14 is associated with a particular switching center 12, and, depending on the location of a particular telephone 16, such phone 16 registers to one of the towers 14 and therefore is switched through the associated switching center 12. Thus, voice communication between the phone 16 and the rest of the world is achieved through the registered tower 14 and the associated switching center 12, and data transmission that originates from the world for the phone 16 is routed to the associated switching center 12 for further transmission to the registered tower 14 and then to the phone 16.

Note that each tower 14 need not necessarily be an actual tower. Instead, the functional elements of a tower 14 may reside on the top or side of a building, on a mountain or mountainside, or in any other appropriate location, all without departing from the spirit and scope of the present invention. Such functional elements may even be positioned on the ground or on a floating platform at sea, if appropriate as dictated by circumstances and terrain, for example.

Such a cellular telephone system 10 is generally known to the relevant public, and therefore need not be described in any greater detail except to the extent so indicated below. Although the present invention as disclosed herein is described in terms of such a cellular telephone system 10, it is to be recognized that the present invention may also be employed in connection with other systems without departing from the spirit and scope of the present invention. For example, such other system may be any wireless or wired system, any audio, video, and/or data transmission system, etc.

Figure 2:
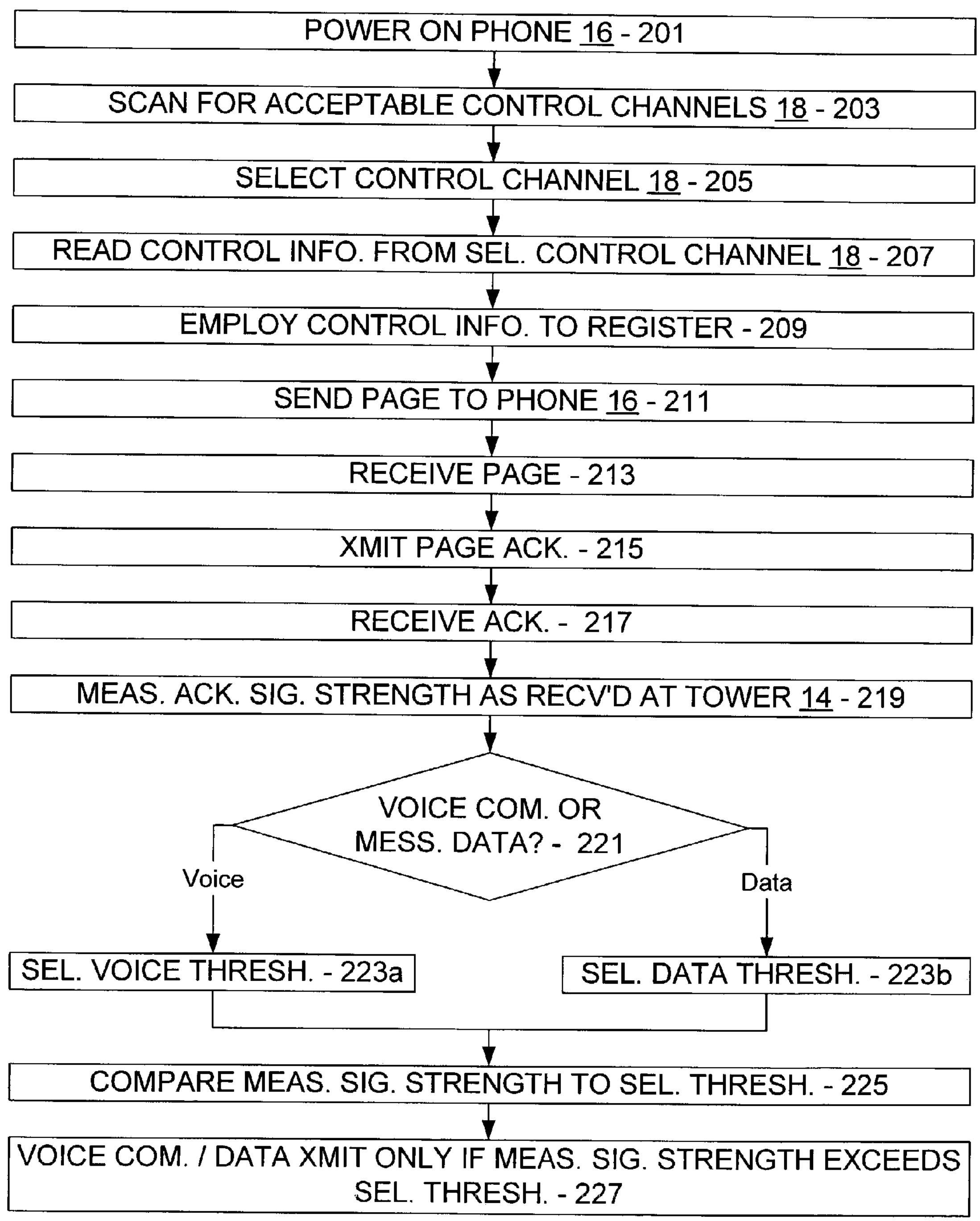
FIG. 2 is a flow chart showing steps performed in selecting a threshold in accordance with one embodiment of the present invention.

Typically, and as seen in FIG. 2, when a phone 16 is first powered on (step 201), the phone 16 scans for acceptable control channels 18 as transmitted from the towers 14 (step 203), and then selects one of the acceptable control channels (step 205). As may be appreciated, each tower 14 transmits at least one control channel 18, and each acceptable control channel 18 may have a minimum signal strength, for example. Likewise, the selected control channel 18 may be the strongest one of the acceptable control channels 18 detected by the phone 16, thus indicating that the corresponding tower 14 is closest to the phone 16. Of course, other bases may be employed for selecting an acceptable control channel 18 without departing from the spirit and scope of the present invention.

As may also be appreciated, the selected control channel 18 includes information readable by the phone 16, including but not limited to frequency information for transmitting to and receiving from the corresponding tower 14. Thus, the phone 16 reads such control information from the control channel 18 (step 207) and uses such control information to contact and register with the corresponding tower 14 and associated switching center 12 (step 209). Thus, the world can contact the phone 16 and the phone 16 can also contact the world through such tower 14 and switching center 12.

In the present invention, the switching center 12 may decide to contact the phone 16 by way of the tower because such switching center 12 is attempting to establish voice communications between such phone 16 and a calling party, because such switching center 12 is attempting to send message data from a message source to the phone 16, because such switching center 12 is attempting to perform another type of communication with the phone 16, or because of another reason. Accordingly, the switching center 12 sends a page to the phone by way of the tower 14 (step 211). As is to be appreciated, such page is sent over a frequency as set forth by the control information on the control channel 18, and the phone 16 is expected to be monitoring such frequency if in fact such phone 16 is still powered on, still within range of the tower 14, and still registered to such tower 14. The phone 16, upon receiving the page (step 213), transmits an acknowledgment of the page to the switching center 12 by way of the tower 14 (step 215). Similar to the page, such acknowledgment is sent over a frequency as set forth by the control information on the control channel 18, and the tower 14 is expected to be monitoring such frequency for such acknowledgment.

When such acknowledgment is received at the tower 14 (step 217), the strength of the acknowledgment signal as received at the tower 14 is measured (step 219). Such strength is typically measured in decibels, although other measurement parameters/units may also be employed without departing from the spirit and scope of the present invention. As was discussed above, once measured, the signal strength is then examined in order to make a judgment of the ability of the phone 16 to commence voice communications or receive message data based on such signal strength. That is, the ability of the phone 16 to receive the message data or commence voice communications may be related, at least roughly, to the signal strength of the acknowledgment as received from such phone 16 at such tower 14. As was pointed out above, such signal strength must be above a minimum threshold value.

As was also pointed out above, a typical cellular phone 16 can reliably receive message data even under conditions where voice communications are inadvisable. That is, conditions may exist (1) where both voice communications and message data reception are advisable, (2) where only message data reception is advisable, or (3) where neither voice communications nor message data reception is advisable. This is particularly true when the message data is simple digitized ASCII data or the like, although other types of message data may be employed without departing from the spirit and scope of the present invention. However, when determining whether voice communications can commence and also when determining whether message data transmission can commence, previous comparisons of signal strength were performed with regard to only a single pre-defined threshold calibrated for voice communications. As a result, message data transmission did not occur under condition (2) even though such message data transmission was in fact advisable.

Accordingly, in one embodiment of the present invention, the determination of whether voice communications can commence is made with regard to a voice threshold, and the determination of whether message data transmission can commence is done with regard to a message threshold different from the voice threshold. The voice threshold and data threshold may be any appropriate thresholds without departing from the spirit and scope of the present invention, although it is expected that the voice threshold will be higher than the data threshold. As a result, message data transmission does in fact occur under condition (2) even though voice communication is not advisable. In one embodiment of the present invention, the voice threshold is about −95 to −90 dBm, while the data threshold is about −105 to −103 dBm.

In particular, and still referring to FIG. 2, the examination of the measured signal strength of the acknowledgment signal begins with a determination of whether voice communications is to commence or message data transmission is to commence (step 221). As should be appreciated, the switching center 12 already possesses such information inasmuch as the switching center 12 originally sent the page to the phone 16 by way of the tower 14 (step 211) because it had a voice communication or data transmission for such phone 16.

Once the determination of voice communication or data transmission has been made, an appropriate signal threshold is selected (step 223*a*, 223*b*). As should be appreciated, in the case of a voice communication, the voice threshold is obtained, and in the case of a data transmission, the data threshold is obtained. Thereafter, the signal strength of the acknowledgement signal from the phone 14 as obtained at the tower 14 is compared to the selected voice threshold or data threshold (step 225), and voice communication or data transmission, as the case may be, is allowed to commence only if the signal strength exceeds the selected threshold (step 227).

Note that, with regard to the message data transmitted, any appropriate data transmission protocol may be employed without departing from the spirit and scope of the present invention. For example, in one embodiment of the present invention, the SMS (Short Message Service) protocol is employed. Such SMS protocol is defined within the GSM (Global System for Mobile Communications) digital mobile phone standard. As was mentioned above, the transmitted data, once received by the phone 16, is then displayed on a display 20 associated with such phone 16. The display 16 may be any appropriate display, but is typically a pixelated display such as an LCD screen on the surface of the phone 16. Thus, a message is composed and sent from an appropriate source, is transmitted to the phone 16 by way of the cellular telephone system 10, and is then displayed by the phone 16 on the display 20 associated therewith. The details of such message composure, transmission, reception, and display are generally know to the relevant public, and therefore need not be described in any greater detail.

As should be understood, the method of transmitting information and choosing a threshold as embodied in the present invention may be employed by the switching center 12 or by another element without departing from the spirit and scope of the present invention. Moreover, although the method has been heretofore described in terms of one threshold for voice communications and another threshold for message data transmission, it is to be recognized that additional thresholds may be employed for other types of communications.

Although not necessary, such method is likely embodied in the form of computer programming that is automatically run. Such programming is relatively straightforward and should be apparent to the relevant public, and therefore need not be described herein in any detail. Accordingly, any particular form of programming and programming language may be employed without departing from the spirit and scope of the present invention.

In the foregoing description, it can be seen that the present invention comprises a new and useful method for deciding whether to transmit message data and for deciding whether voice communications can commence, wherein such decision is based at least in part on one threshold for message data transmission and another threshold for voice communications. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for determining whether to transmit from a mobile unit to a fixed unit, the transmission being one of a first type and a second type, the method comprising:

receiving a signal from the fixed unit at the mobile unit;

measuring the strength of the signal as received at the mobile unit;

determining whether the transmission is of the first type or the second type;

selecting a first threshold if the transmission is of the first type;

selecting a second threshold if the transmission is of the second type;

comparing the measured signal strength to the selected threshold; and proceeding with the transmission only if the measured signal strength exceeds the selected threshold.

2. The method of claim 1 wherein the transmission is one of a voice communication and message data transmission, the method comprising:

determining whether the transmission is a voice communication or a message data transmission;

selecting a voice threshold if the transmission is a voice communication; and selecting a data threshold if the transmission is a message data transmission.

3. The method of claim 2 comprising:

selecting a voice threshold if the transmission is a voice communication; and selecting a data threshold lower than the voice threshold if the transmission is a message data transmission.

4. The method of claim 1 wherein the transmission is one of a first type, a second type, or a third type, the method comprising:

determining whether the transmission is of the first type, the second type, or the third type;

selecting a first threshold if the transmission is of the first type;

selecting a second threshold if the transmission is of the second type; and selecting a third threshold if the transmission is of the third type.

5. The method of claim 1 for determining whether to transmit from a portable radio transceiver to a radio tower, the method comprising:

receiving a signal from the radio tower at the portable radio transceiver; and measuring the strength of the signal as received at the portable radio transceiver.

6. The method of claim 5 for determining whether to transmit from a cellular telephone to a cellular telephone system tower, the method comprising:

receiving a signal from the tower at the telephone; and measuring the strength of the signal as received at the telephone.

7. The method of claim 1 further comprising sending a page from the mobile unit to the fixed unit, wherein receiving a signal from the fixed unit at the mobile unit comprises receiving an acknowledgment of the page at the mobile unit.

* * * * *